United States Patent [19]

Bien et al.

[11] 4,334,777
[45] Jun. 15, 1982

[54] METHOD OF MONITORING MOTION

[75] Inventors: Fritz Bien, Billerica; Morton Camac, Lexington, both of Mass.

[73] Assignee: Aerodyne Research, Inc., Bedford, Mass.

[21] Appl. No.: 829,928

[22] Filed: Sep. 1, 1977

Related U.S. Application Data

[63] Continuation-in-part of Ser. No. 708,307, Jul. 26, 1976, Pat. No. 4,086,808.

[51] Int. Cl.³ .............................................. G01B 9/02
[52] U.S. Cl. ...................................... 356/349; 73/657
[58] Field of Search ................. 356/28, 32, 33, 106 R, 356/111, 113, 349; 73/657

[56] References Cited

U.S. PATENT DOCUMENTS 3,782,176  1/1974  Jacobs ................................... 73/657

Primary Examiner—John K. Corbin
Assistant Examiner—Matthew W. Koren
Attorney, Agent, or Firm—Frank A. Steinhilper

[57] ABSTRACT

Methods and apparatus are disclosed for studying motion of an object or element, to determine not only quantities of motion but also direction of motion. A laser beam or the like is circularly polarized and directed to two or more retroreflectors and then to a detector. Beams of different frequencies are established and determination of relative direction of motion of the retroreflectors is made from the increase or decrease of frequency of beats of one beam against the other. In one embodiment, left and right circularly polarized light is reflected, and one of the beams is frequency-shifted. The light, being circularly polarized, is insensitive to rotational orientation of the test object, while maintaining directional and motion information.

6 Claims, 3 Drawing Figures

METHOD OF MONITORING MOTION

RELATIONSHIP TO OTHER APPLICATIONS

This application is a continuation-in-part of application Ser. No. 708,307, filed July 26, 1976 now U.S. Pat. No. 4,086,808.

BACKGROUND OF THE INVENTION

In co-pending application Ser. No. 708,307 filed July 26, 1976, there is disclosed a way of motion analysis employing a suitable light source such as a laser beam reflecting from retroreflectors positioned on an element whose motion is to be analyzed. For example, two or more retroreflectors may be positioned on a rotating blade or other element in motion, and a laser beam directed to such retroreflectors with the reflected beams creating interference patterns on a detector. The system according to that invention is effective to analyze vibration or similar motion of turbine blades or the like and to analyze the motion of a more distant object, in each case to determine the amplitude of vibration, the speed of motion or other factors of motion being studied. It is now believed that the invention described in that co-pending patent application is the most sophisticated way of motion analysis now available for such study.

The invention of that prior application does not, however, in and of itself designate the direction of motion. It is capable of determining the amplitude and period of vibration but standing alone it does not determine the phase of such vibration. When the prior system is applied to distant moving objects such as, for example, aircraft or the like, it can determine when and how fast an airplane is tipping or turning, but does not in and of itself determine whether the object is tipping or turning toward or away from the source of a laser beam. Such directional analysis heretofore has required secondary information or other means such as, for example, computerized problem-solving. Similarly, a distant object such as a boat or ship whose linear motion may be relatively inconsequential can also be monitored with, again, similar limitations to the measurement of amplitude, frequency, etc. (yaw, pitch and roll) but not the direction thereof. Accordingly, there is a need for a way to pursue motion analysis which, also, tells the direction of such motion.

According to the present invention a way has now been found for motion analysis including determination of the direction of motion toward or away from the source of study. Light or similar radiation from a coherent source is formed into separable beams which are separately reflected, and the carrier frequency of one of them is modified. For example, coherent light, such as, for example, a laser beam is directed to two or more motion monitoring elements such as retroreflectors, and the reflected beams are causing to beat on one another. An increasing beat rate designates motion in one direction to shorten a light path, and a decreasing beat rate designates lengthening the light path.

According to one embodiment of the invention, the source of coherent radiation such as, for example, a laser beam is directed to an element whose motion is to be studied. Part of the beam is passed through a quarter wave plate then a plane polarizer to convert unpolarized light to plane polarized light. This beam is directed to a retroreflector mounted on an element whose motion is to be studied. After reflection from such retroreflector the beam is again passed through a quarter wave plate to convert the plane polarized light to circularly polarized light, for instance right hand circularly polarized light. The beam is passed through another quarter wave plate to return the circular polarization to linear. The return beam from other retroreflector is converted to left hand circular polarized radiation and re-converted to linear polarized radiation of the opposite direction from the first beam.

One of the two beams of linearly polarized radiation is frequency shifted so that it has a carrier frequency slightly different from the other beam. According to one embodiment as shown in the drawings and as described, an acousto-optic modulator shifts the frequency of one beam. In another embodiment, not shown, a beam may be doppler shifted by reflection from a moving body or by other frequency shifting means.

After the two reflected beams have been circularly polarized and converted back to linear polarization, and after one of the beams has been frequency shifted, then made to have the same polarization as the other beam, then the two beams are directed to the face of a photodetector. The two different frequencies cause beats on the face of the photodetector, and a change in the frequency of the beats designates that the total path from the laser source to the retroreflectors and back to the photodetector is changing. An increase designates that the higher frequency beam is travelling through a decreasing total path length compared with its companion beam, and a decrease in beat frequency designates that the higher frequency beam is going through an increasing path length.

Accordingly, the beat frequency in and of itself designates three factors of motion. In the case of vibration, the period between maximum or minimum in beat frequency corresponds to the period of vibration of the element being observed. Next the beat frequency designates the velocity of relative motion between the two retroreflectors; in the case of vibrational motion this velocity of relative motion also designates amplitude. The third motion factor determined by the beat frequency is the direction of motion of the one element relative to the other to lengthen or shorten the total beam path of the higher frequency beam.

For a detailed description of the invention, reference is made to co-pending patent application Ser. No. 708,307 filed July 26, 1976, and referred to hereinbefore and to the drawings in which.

Figure 1:
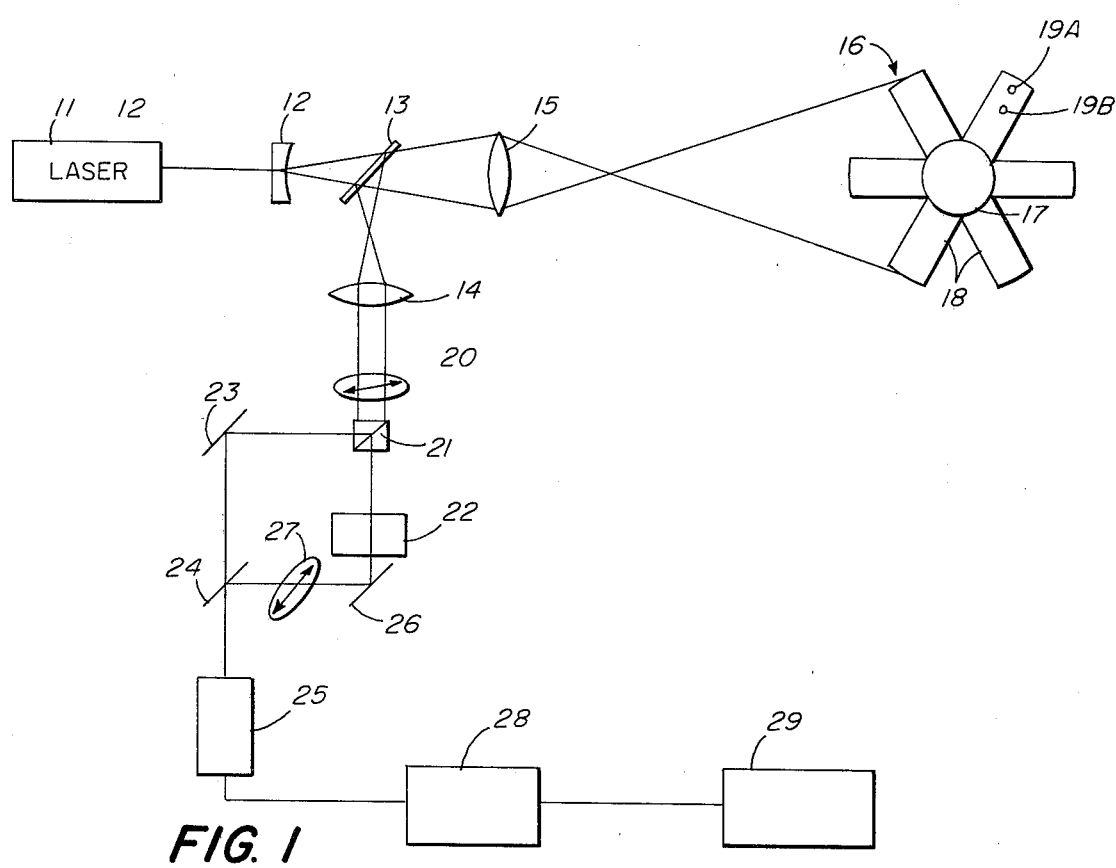
FIG. 1 is a schematic view of a motion analysis system according to one embodiment of the invention in which motion of a rotating blade is analyzed.

The system illustrated in FIG. 1 includes a laser 11 positioned to send a beam of coherent light to a beam spreader 12 and thence to a beam splitter 13. The beam passing through beam splitter 13 is directed through a focusing lens 15 and then to a test object generally designated 16. As illustrated, the test object 16 may be a turbine element or the like, including a turbine hub 17 and a plurality of blades 18 on one or several of which are a pair of retroreflectors 19A and 19B.

Light from the laser 11 impinging on these retroreflectors 19A and 19B is reflected directly back on itself through lens 15 and to beam splitter 13. The test beam is then directed through lens 14 to a quarter-wave plate 20 and to a polarizing beam splitter 21. One portion of the split beam from the polarizing beam splitter is directed to an acousto-optic modulator 22. The other portion is directed to a mirror 23 thence to a beam splitter 24 and through the beam splitter to a photodetector 25. The first portion of the beam, from acousto-optic modulator 22, is directed to a mirror 26. This portion is then brought through a half wave plate 27 to match the polarization of the other beam and then caused to join the other beam at beam splitter 24, also impinging on detector 25.

Laser 11 is a conventional, preferably continuous wave laser, which may emit visible radiation or other radiation such as infra-red or ultra-violet. In any case, photodetector 25 is sensitive to the emission of laser 11.

In photodetector 25, a signal is developed corresponding to the signal of the two laser beam portions including the modulation imparted thereto by motion of blades 18 and the acousto-optic modulator 22. The signal from photodetector 25 then is fed to an FM demodulator 28 which generates a signal to AM signal means 29. The signal at signal means 29 is the consequence of beat frequencies relative to reflection from retroreflector 19A and retroreflector 19B. It is usual to employ motion analysis of rotating blades or the like, and in such case the signal at signal means 29 includes information relative to period of vibration, amplitude of vibration, and direction or phase of vibration.

Figure 2:
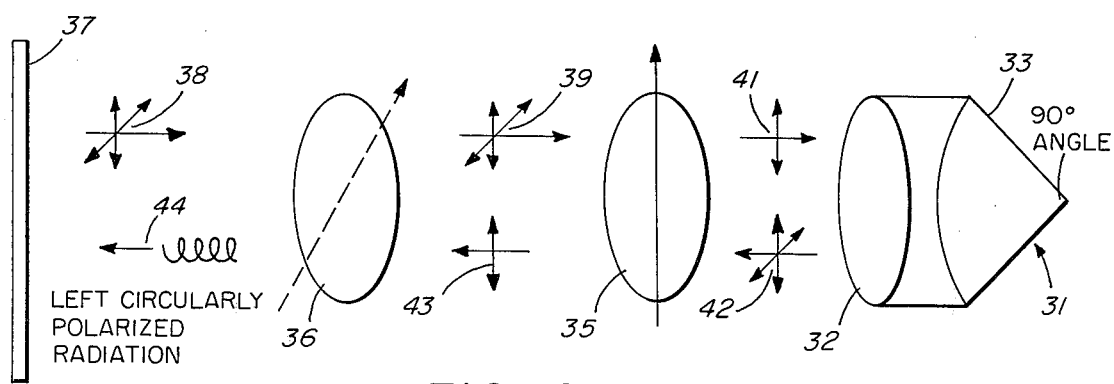
FIG. 2 is an exploded schematic view of a retroreflector assembly including polarization means according to the system of FIG. 1.

In FIG. 2 is illustrated an exploded schematic view of a retroreflector assembly such as retroreflector 19A or retroreflector 19B. The assembly includes a retroreflector element 31 conventionally comprising a front face 32 and a corner reflector rear element or face 33 of conventional design. The rear reflector element 33 is conventionally a pyramid-shaped surface for total internal reflection with three rear faces formed at quite precise 90° angles, such that light entering through face 32 is reflected off the rear surfaces 33 directly back on itself with precise 180° reflection, all as is well known in the art. Positioned in front of face 32 of retroreflector 31 is a plane-polarizer sheet 35 and in front of polarizer sheet 35 is a quarter-wave plate 36. If desired, a color filter 37 may be positioned in front of the retroreflector to cause it to be selectively operable with one of two or more laser beams at different wavelengths. As illustrated in the diagrams of FIG. 2, unpolarized light is directed to the retroreflector assembly as illustrated in polarization diagram 38. Such light as a consequence of passing through quarter-wave plate 36, is not affected as shown in diagram 39, and upon passing through plane polarizer sheet 35 is polarized for entry into the retroreflector 31 as shown in diagram 41. Upon emergence from retroreflector 31 and polarizer sheet 35, the light is re-polarized as indicated in diagram 42 and diagram 43. Upon emergence from quarter-wave plate 36, the light is circularly polarized as, for example, left circularly polarized as indicated in diagram 44. In the actual embodiment, retroreflector 19A can be considered as operating with left polarized light and retroreflector 19B with right polarized light.

Figure 3:
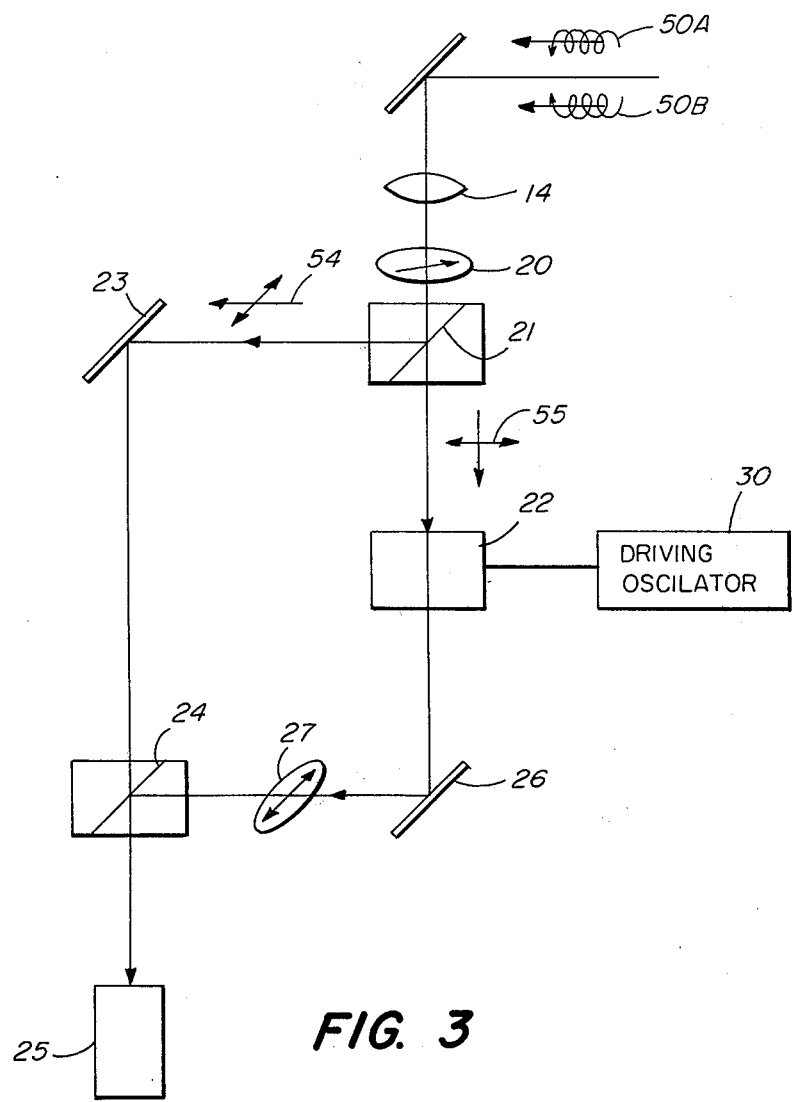
FIG. 3 is a schematic view of the modulation apparatus according to the system of FIG. 1.

In FIG. 3 is shown the demodulation section of the apparatus according to FIG. 1. Modulation beams reflected from retroreflectors 19A and 19B are directed to beam splitter 13, also shown in FIG. 1. These beams illustrated as beam 50A from retroreflector 19A and beam 50B from retroreflector 19B are doppler shifted as a consequence of motion of retroreflectors 19A and 19B, and also are circularly polarized, beam 50A being polarized in one direction and beam 50B in the other direction. These beams are directed to a lens 14 to make the beams parallel, after which they are directed to quarter-wave plate 20. Upon emergence from quarter-wave plate 20, the beams are plane polarized as shown in diagram 52 where it is illustrated that beam 50B is polarized in the one direction and 50A polarized in the other direction. These polarized beams are then directed to polarizing beam splitter 21 wherein beam 50B is reflected to mirror 23 and is polarized in the direction indicated in diagram 54. Beam 50A is split away from beam 50B and is polarized in the opposite direction, as shown in diagram 55. Beam 50B being directed toward mirror 23 is then reflected through beam splitter 24 and to photodetector 25. It is noted that beam 50B has not been frequency shifted during its path of travel to photodetector 25.

Beam 50A upon emerging from polarizing beam splitter 21, is directed to acousto-optic modulator 22, which may be a conventional device such as a Bragg cell operated by means of driving oscillator 30. Accordingly, beam 50A which has been frequency shifted by the Bragg cell is directed to the mirror 26, through half wave plate 27 to beam splitter 24 where it joins the path of beam 50B. Upon rejoining the two beams 50A and 50B have different modulation. Beam 50B has been doppler shifted by motion of retroreflector 19B to shorten or lengthen the path of travel of the beam. Beam 50A also has been doppler shifted by motion of retroreflector 19A and in addition, has been frequency shifted by Bragg cell 22. If retroreflectors 19A and 19B do not move with respect to each other, the combined beams 50A and 50B will produce a beat frequency at the photodetector 25, which frequency corresponds to the amount of frequency shift imparted by the Bragg cell. When, however, retroreflectors 19A and 19B move with respect to one another, additional modulation is imparted to the two beams as a consequence of doppler shifting, and this modulation causes the beat to increase or decrease in frequency depending on whether the doppler modulation is in the same sense or opposite sense of the carrier modulation produced by the Bragg cell. Thus, the increasing or decreasing beat frequency directly designates forward or backward motion of retroreflectors 19A with respect to the motion of retroreflector 19B.

We claim:

1. In a method of monitoring motion of a mechanical element through a path of motion, including determining the direction of motion toward or away from a source, the steps comprising:

mounting on said mechanical element a plurality of reflectors characterized by reflecting beams of electromagnetic radiation from a fixed location to a fixed detector position independently of the position of said reflectors during the path of motion being monitored, directing coherent light to each of at least two of said reflectors, thereby reflecting at least two beams of light to said detector position, each beam being modulated by reflector motion, frequency shifting one of said beams, beating the resulting frequency shifted beams at said fixed detector position, thereby, identifying direction of motion as a function of increasing or decreasing beat frequency.

2. In a method of monitoring motion of a mechanical element including determining the direction of motion toward or away from a source, the steps comprising:

mounting on said mechanical element at least a pair of retroreflectors characterized by reflecting beams of light to a fixed detector position independently of the position of said retroreflectors during the motion being monitored, moving said element through a path of motion to be monitored, directing coherent light to each of said pair of retroreflectors, and reflecting beams of light to said detector position, establishing a different carrier frequency of one of said beams relative to the other of said beams, whereby each reflected beam includes a carrier frequency modulated by a signal frequency corresponding to motion of said reflector, beating the resulting beams at said fixed detector position, thereby identifying direction of motion as a function of increasing or decreasing beat frequency.

3. In a method of monitoring motion of a mechanical element through a predetermining path of motion and determining the direction of motion of a portion of said mechanical element toward or away from a source, the steps comprising:

mounting on said mechanical element at least a pair of retroreflectors characterized by reflecting polarized beams of light to a fixed detector position independently of the position of said reflectors during the motion being monitored, moving said mechanical element through a predetermined path of motion directing coherent light to each of said pair of retroreflectors, and reflecting two beams of polarized light to said detector position, separating said beams, establishing a different carrier frequency of one of said beams relative to the other of said beams, and beating the resulting beams at said fixed detector position, thereby identifying direction of motion as a function of increasing or decreasing beat frequency.

4. The method of claim 3, in which said coherent light is laser radiation.

5. In a method of monitoring motion of a mechanical element including determining the direction of motion toward or away from a source, the steps comprising:

mounting on said mechanical element a plurality of retroreflectors characterized by reflecting polarized beams of radiation from a fixed beam source to a fixed detector position independently of the position of said reflectors during the motion being monitored, moving said element through a predetermined path of motion directing a laser beam to each of two said retroreflectors, thereby reflecting at least two beams of polarized light to said detector position, establishing for the reflected beam from one of said retroreflectors plane polarization in a first orientation and for the reflected beam from another of said retroreflectors plane polarization in a second orientation, separating said reflected beams, and frequency shifting one of said separated beams, realigning the polarization and beating the resulting beams at said detector position, thereby identifying direction of relative motion of said reflectors as a function of increasing or decreasing beat frequency.

6. A method of monitoring motion in a moving mechanical element regarding the motion of one portion of said element relative to another in a direction toward or away from a test location, said method including a determination of the direction of said motion comprising:

mounting on said element at least two reflecting elements operating as a pair, said reflecting elements mounted to reflect electromagnetic radiation to a fixed detection location regardless of their position in a path of motion, moving said element through a path of motion to be monitored directing coherent radiation onto both reflecting elements simultaneously for reflection from said reflecting elements to establish two reflected beams each of which carries a frequency modulated signal corresponding to varying velocity of motion changing the length of the radiation path of said beams, establishing a different carrier frequency for each reflected beam, and comparing the two reflected beams to recognize a monitor signal corresponding to the difference between the frequencies of said beams, whereby an increasing frequency of the monitor signal denotes motion of a first one of said reflecting elements to shorten the length of the radiation path relative to a second one of said reflecting elements and a decreasing frequency denotes relative motion in the opposite direction.

* * * * *